No. 822,615. PATENTED JUNE 5, 1906.
L. G. LANGSTAFF.
VEHICLE WHEEL.
APPLICATION FILED JUNE 29, 1905.
2 SHEETS—SHEET 1.
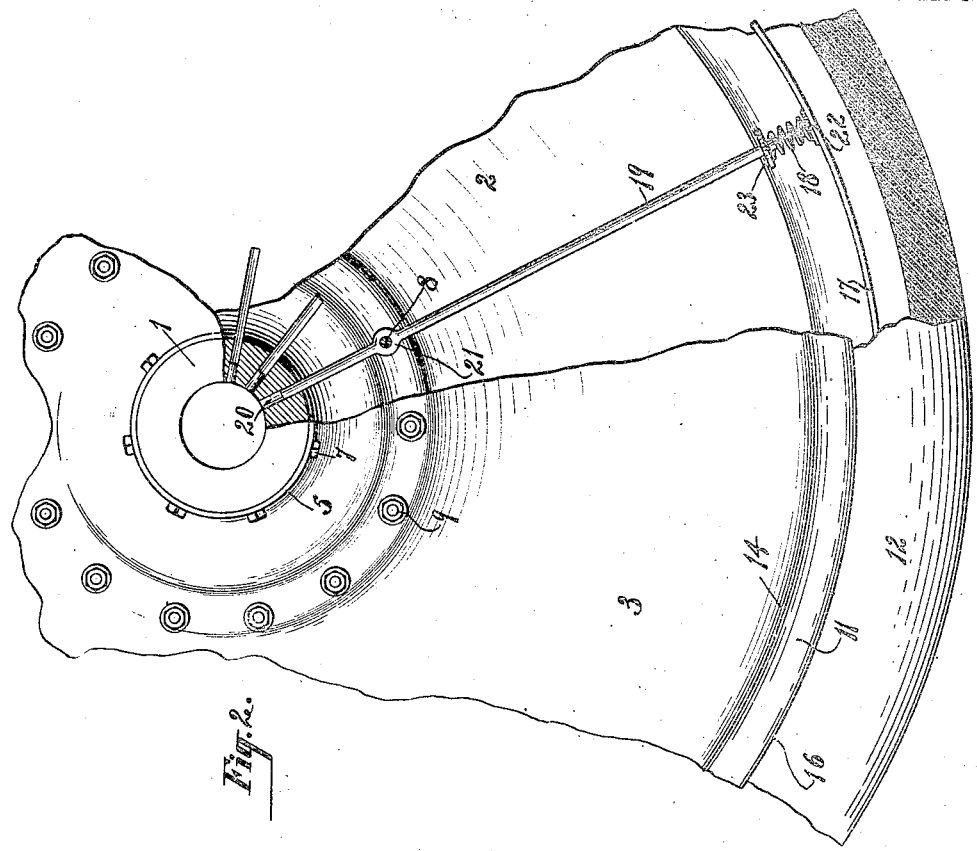
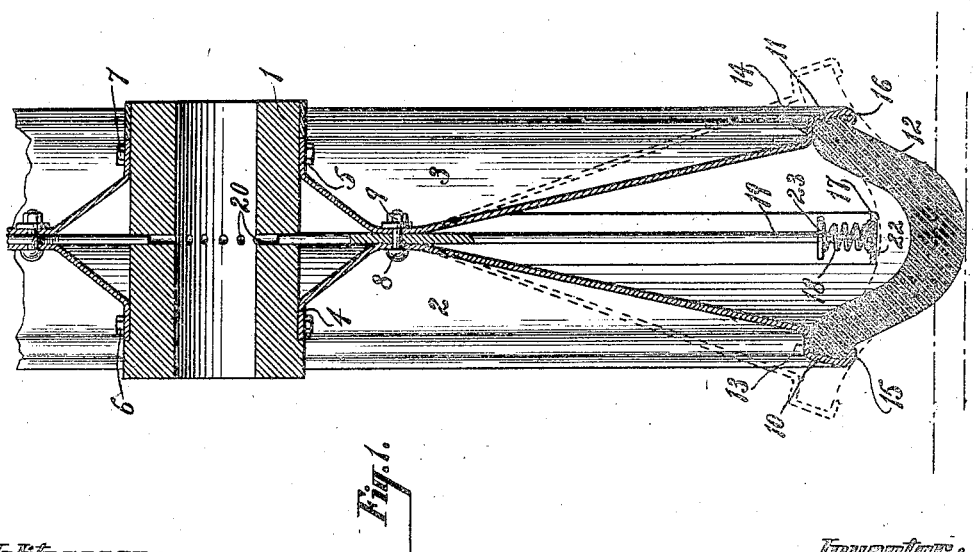

No. 822,615. PATENTED JUNE 5, 1906.
L. G. LANGSTAFF.
VEHICLE WHEEL.
APPLICATION FILED JUNE 29, 1905.
2 SHEETS—SHEET 2.
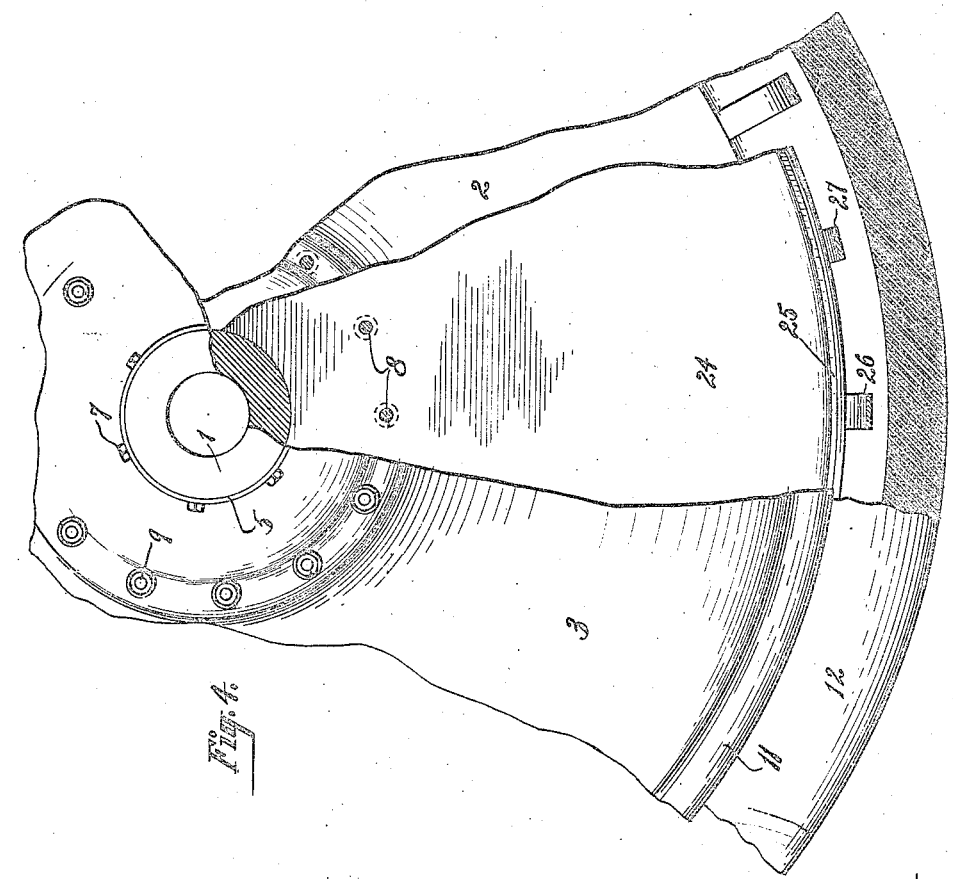
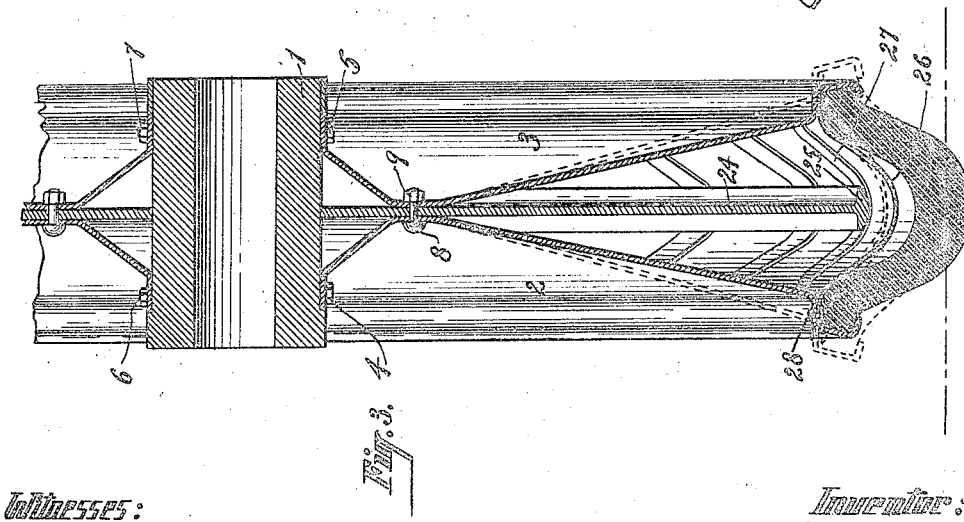
Witnesses:
Inventor:

UNITED STATES PATENT OFFICE.

LEWIS G. LANGSTAFF, OF NEW YORK, N. Y.

VEHICLE-WHEEL.

No. 822,615.   Specification of Letters Patent.   Patented June 5, 1906.

Application filed June 29, 1905. Serial No. 267,493.

*To all whom it may concern:*

Be it known that I, LEWIS G. LANGSTAFF, a citizen of the United States, and a resident of the borough of Brooklyn, in the city and State of New York, have invented a new and useful Vehicle-Wheel, of which the following is a specification.

The object of this present invention is to provide a vehicle-wheel of novel form whereby the tire may have great resiliency without the use of an inclosed tube—such, for instance, as a pneumatic tire.

A further object is to provide a wheel of the above character which will be very strong, in which a very few parts are used in the construction of the wheel, and in which the tire is permitted to spread laterally under spring tension when weight is applied thereto, but which will resume its normal shape when pressure is removed therefrom.

In the accompanying drawings, Figure 1 represents in cross-section a portion of one form of vehicle-wheel embodying my invention. Fig. 2 is a detail side view, partially in section, of the same. Fig. 3 is a portion of a wheel embodying another form of my invention, and Fig. 4 is a detail view of the same, partially in side view and partially in section.

Referring to the form shown in Figs. 1 and 2, the hub of the wheel is denoted by 1 and may be of any well-known and approved construction. Two side disks 2 and 3 have their central portions secured to the hub 1 preferably by providing lateral flanges 4 and 5 engaging the periphery of the hub through which and the flanges an annular series of bolts 6 and 7 pass. These disks 2 and 3 are spaced a considerable distance apart at the hub and are brought into proximity to each other a short distance away from the hub by an annular series of fastening devices, such as bolts and nuts 8 and 9.

The portions of the disks 2 and 3 exterior to the fastening devices 8 and 9 flare away from each other, and the disks at their peripheries are provided with annular recesses 10 and 11 for the reception of the side edges of the tire 12. These recesses are formed in the inner faces of the disks in the present instance by bending the disks laterally, as shown at 13 and 14, to form annular shoulders, and inwardly, as shown at 15 and 16, to form annular retaining rims or flanges.

The tire 12 is normally made convex in cross-section and has its opposite edges seated in the annular recesses 10 and 11 of the disks 2 and 3. When weight is applied to the tire—as, for instance, when the wheel is traveling along the ground—the tread of the tire will be depressed, thus spreading the disks 2 and 3 apart laterally. These disks may be made of spring metal, so that they will exert the required amount of resistance to the tire and so that the tire will be forced back to its normal convex shape in cross-section when the load is removed therefrom.

To prevent the tire from being depressed to too great an extent, I provide an auxiliary yielding stop for the tire, which is arranged to engage the same between the side edges of the tire, as follows: A flexible band is located in the space between the disks 2 and 3, which band is yieldingly held in position by a plurality of springs 18, carried by spokes 19, radiating from the hub 1. These spokes are preferably held in position by entering their inner ends into radial holes 20 in the hub 1 and by passing the bolts 8, which secure the disks together, through enlarged portions 21 in the said spokes.

The springs 18 are here shown as being provided with suitable seats 22 or the flexible band 17 and suitable seats 23 or the ends of the spokes 19. It will be understood that this band 17 is located in position to engage the tire after it has been depressed to a predetermined extent, so as to exert additional resistance upon the same, and finally to stop the depression of the tire before it is depressed sufficiently far to cause the peripheries of the disks 2 and 3 to engage the surface upon which the wheel is resting.

In the form shown in Figs. 3 and 4 the hub, disks, and tire are all substantially the same as described with reference to the form shown in Figs. 1 and 2, the change being in the auxiliary resistance device for the tire. This device in this instance comprises a centrally-arranged disk 24, having a peripheral flange 25 located at the desired point inwardly from the tire 12. This disk 24 engages the hub 1 and is secured between the tire-holding disks 2 and 3 by the bolts 8. A plurality of springs are spaced between the inner walls of the tire and the flange 25 of the intermediate disk 24 for yieldingly resisting the inward movement of the tire when weight is applied thereto. In the present instance these springs, which are arranged transversely to the wheel, comprise two annular series 26 27, the springs of one series alternating with the springs of the other series and arranged at different distances away from the inner walls of the tire, so that the tire will first engage the springs of one series before it engages the springs of the other series. The flange 25 of the intermediate disk 24 serves as a permanent stop for the tire before it is depressed sufficiently far inwardly to cause the peripheries of the disks 2 and 3 to engage the surface upon which the wheel rests. Each of these transverse springs 26 27 may be secured, as shown at 28, at one end to one of the tire-holding disks, its other end being free to slide in the recess of the opposite disk, so that the lateral spread of the disks as the tire is depressed is not interfered with by the said springs.

It will be seen that the devices for engaging the sides of the tire, which in the present instance are shown as disks 2 and 3, may be made in various forms, the gist of the invention lying in means for yieldingly holding the side edges of the tire at certain positions with respect to each other, the said devices permitting the side edges of the tire to be spread apart as the tread of the tire is depressed.

It is evident that other forms than those herein shown might be employed for carrying out my invention. Hence I do not wish to limit myself strictly to the construction herein set forth; but

What I claim is—

1. A vehicle-wheel comprising a hub, a tire and laterally-spreading spring means connecting the hub with the side edges of the tire.

2. A vehicle-wheel comprising a hub, a tire and laterally-spreading spring-disks connecting the hub with the side edges of the tire.

3. A vehicle-wheel comprising a hub, a tire, laterally-spreading spring means connecting the hub with the side edges of the tire and auxiliary means for yieldingly supporting the tire after it has been depressed to a predetermined point.

4. A vehicle-wheel comprising a hub, a tire, laterally-spreading spring-disks connecting the hub with the side edges of the tire and means for yieldingly supporting the tire after it has been depressed to a predetermined point.

5. A vehicle-wheel comprising a hub, a tire, laterally-spreading spring means connecting the hub with the side edges of the tire and a stop for preventing the undue depression of the tread of the tire.

6. A vehicle-wheel comprising a hub, a tire, laterally-spreading spring-disks connecting the hub with the side edges of the tire and a stop for preventing the undue depression of the tire.

7. A vehicle-wheel comprising a hub, laterally-spreading disks secured thereto, a tire of convex form in cross-section and annular recesses formed in the inner faces of the disks at their periphery for receiving the side edges of the tire.

In testimony that I claim the foregoing as my invention I have signed my name, in presence of two witnesses, this 27th day of June, 1905.

LEWIS G. LANGSTAFF.

Witnesses:
   FREDK. HAYNES,
   HENRY THIEME.